Aug. 2, 1960    V. E. CARBONARA ET AL    2,947,872
STAR TRACKING SYSTEM
Filed Jan. 23, 1956    3 Sheets-Sheet 1

INVENTORS
VICTOR E. CARBONARA
HOWARD J. ECKWEILER
BY JAMES B. O'MALEY
PAUL D. HANSELL
Ostrolenk, Faber,
Gerb & Soffen ATTORNEYS

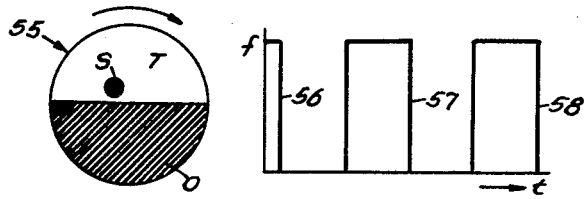
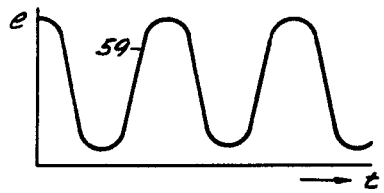
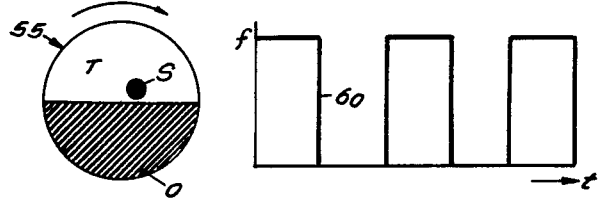
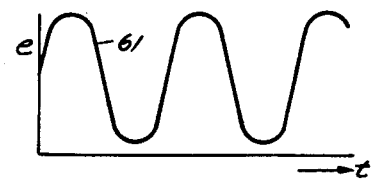
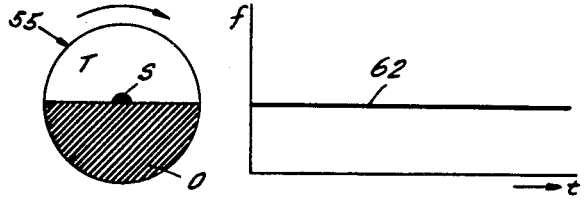
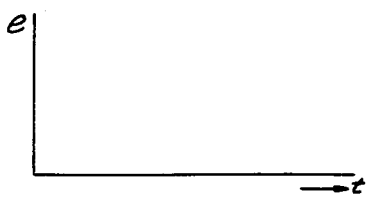
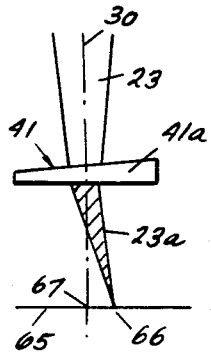
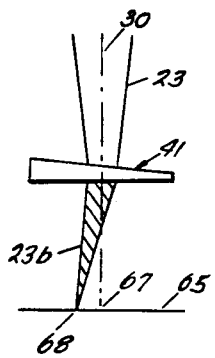
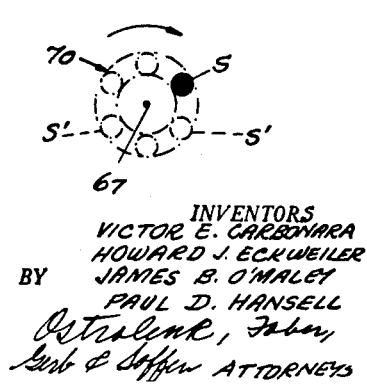

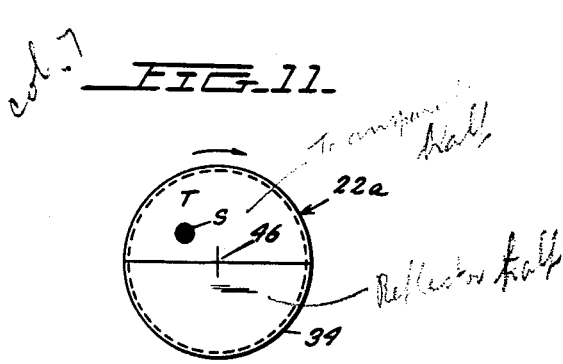
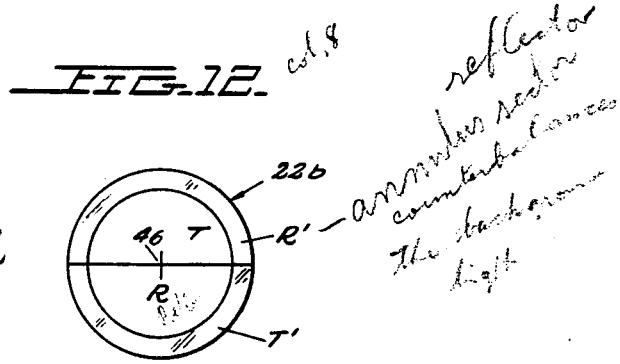
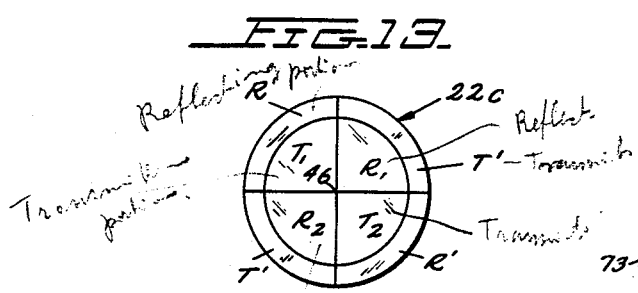
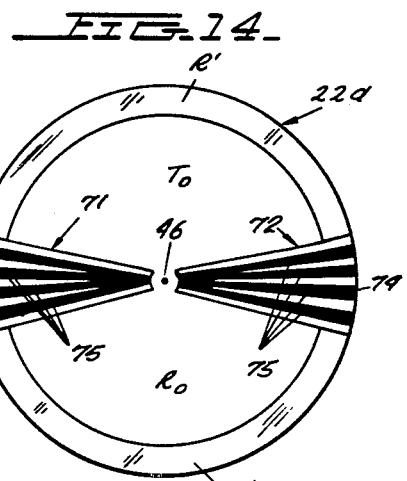
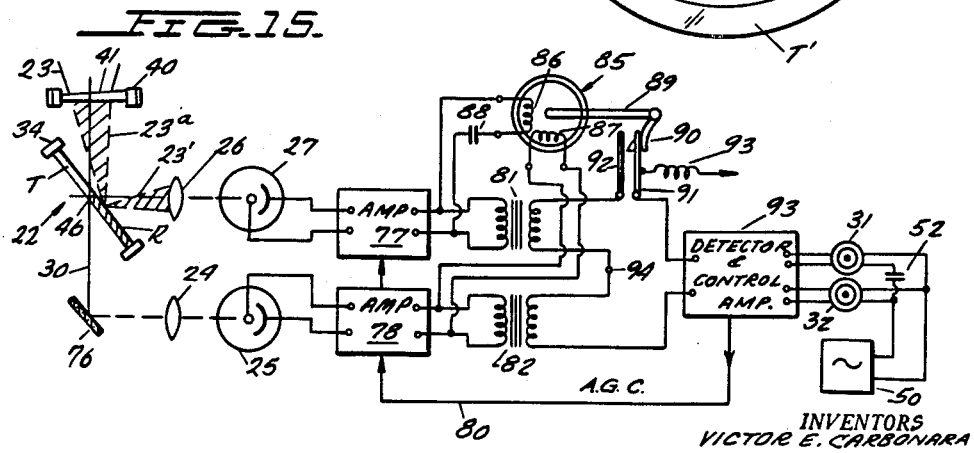

United States Patent Office 2,947,872
Patented Aug. 2, 1960

2,947,872

STAR TRACKING SYSTEM

Victor E. Carbonara and Howard J. Eckweiler, Manhasset, James B. O'Maley, Seaford Harbor, and Paul D. Hansell, Jamaica, N.Y., assignors to Kollsman Instrument Corporation, Elmhurst, N.Y., a corporation of New York Filed Jan. 23, 1956, Ser. No. 560,744

4 Claims. (Cl. 250—203)

This invention relates to improvements in star tracking systems, more particularly relating to novel photoelectric sextant arrangements which automatically maintain their optical axis in the direction of a selected star.

In an automatic star tracking system, means are provided to translate the star light flux into positional information of the star with respect to the field of a telescope or sextant. Such positional information is translated into electrical signals which control positioning motors operative on the telescope or sextant to maintain the designated star aligned with the optical axis thereof. This invention is in the nature of improvements on the systems disclosed in Patent No. 2,713,134 entitled, "Radiant Energy Controlled Follow-Up System," of July 12, 1955, and the co-pending patent application Serial No. 321,218, both assigned to the same assignee as the present case.

In the prior systems, semi-circular shutters and/or raster arrangements were used to effect modulation of the light flux of the field. Such elements caused actual wasting or absorption of the light flux for at least fifty percent of the time. When a raster and a shutter were used in cascade, as in the aforesaid application, as much as seventy-five percent of the incident star light remaintained unused by the system. Waste of the start light in this manner is inefficient in that larger telescope units are required for equivalent results; and the signal to noise ratio upon which the ultimate sensitivity and operativeness of the system depend is poorer as compared to the present system wherein substantially full utilization of the star light flux is made.

In accordance with the present invention, means are provided to create an electrical signal of the star light flux by a novel means of modulation thereof, wherein detection of such signal is available to render the system reliably operative under severe atmospheric conditions or obscuration of the desired star light. In accordance with the invention, means are provided to cause the image of the star to be moved in a regular manner about the optical axis of the system when such axis is otherwise aligned with the actual star position. In the exemplary embodiment to be described, such means for nutation may comprise an optical prism or wedge in the path of the light beam. Rotation of an optical wedge transversely of the optical system axis produces the nutation of the star image across the path of the shutter and avoids a zero or signal extinction due to shutter action on the star light, as will be more fully set forth hereinafter.

In such manner, the present invention avoids an actual star image being statically centered upon the optical axis when the star tracker is directly on the star position. By thus affording a continuous signal in accordance with star position, regardless of its location in the field of the telescope, continuous and positive indication of star presence is attained without the requisite of a raster or double modulation.

It is accordingly an object of the present invention to provide a novel star tracking system embodying means for oscillating or nutating the star in a regular or rhythmic fashion.

A further object of the present invention is to provide a novel star tracker embodying means for nutating the star image with an optical wedge.

Another object of the present invention is to provide a novel star tracking system embodying a single semicircular shutter for modulating the star light flux, in conjunction with nutation means for presenting continuous indication of star presence regardless of its location in the field of view.

A further feature of the present invention resides in a novel shutter for effectively producing signal modulation of a star with substantially one hundred percent of light flux utilization. In prior semi-circular shutter systems the light flux was obscured, absorbed or otherwise unused for at least the fifty percent interval during its opaque phase. In accordance with the present invention, the opaque sector of the shutter is replaced with means whereby the light flux impinging thereon is directed to a companion photo-electric cell. Such means may take the form of a reflecting surface, as will be described hereinafter. The two photoelectric cells are thereupon connected in push-pull relationship to form a composite control signal twice the amplitude of that produced by either one.

Also, as will be described, the signal to noise ratio of such push-pull arrangement is enhanced due to the systems arrangement. Advantageously, for a given system sensitivity, the size of the telescope and associated optical elements are substantially reduced due to the full light flux utilization. Further, the combination of full light flux utilization by the shutter, with the nutation means aforesaid, eliminates the use of a chopper or raster to effect a second modulation of the beam. The resultant star light tracking system, with a single shutter effectively using the star light flux substantially one hundred percent, maintains all of the advantages of the double modulation system described in the aforesaid application.

It is accordingly another object of the present invention to provide a novel star tracking system with shutter means having alternate light-transmitting and light-reflecting elements to energize associated photoelectric cells in push-pull relationship.

Still another object of the present invention is a star tracking system incorporating means for deriving positional information of a star regardless of its position in the field of view and utilizing the star light flux substantially one hundred percent.

Another feature usable with the novel light shutter herein is the use of raster elements or spokes in predetermined sectors of the shutter, independent of their basic light transmitting and reflecting action, to provide high frequency carrier information, such as to the star's magnitude and for automatic tracking sensitivity control.

A further object of the present invention accordingly resides in the novel shutter thereof, incorporating high frequency raster or chopper areas between the associated light transmitting and reflecting sectors thereof.

The above and further features, objects and advantages of the present invention will become more apparent in the following description of exemplary embodiments thereof, taken in conjunction with the drawings, in which.

Figure 3:
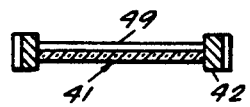
Figure 2:
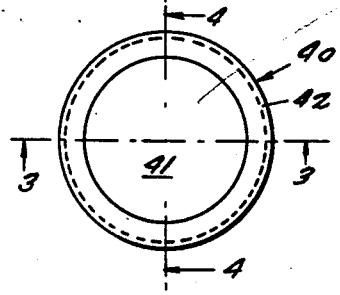
Figure 2 is a plan view taken along the line 2—2 of the optical wedge that nutates the star beam.
Figure 4:
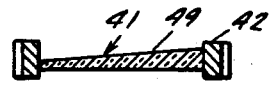

Figures 3 and 4 are transverse cross-sectional views through the optical wedge of Figure 2 taken along the respective lines 3—3 and 4—4 thereof.

Figure 5A is a diagram of a semi-circular shutter operating on a star image displaced off center by an amount more than image radius; Figure 5B represents the light flux curve due to the action of the shutter of Figure 5A; and Figure 5C represents the electrical signal derived from the flux curve of Figure 5B.

Figure 6A is a diagram of a semi-circular shutter operating on a star image displaced radially from that in Figure 5A by 90°; Figure 6B being the light flux resultant from the action of Figure 6A; and Figure 6C the electrical signal derived from the flux curve of Figure 6B.

Figure 7A is a diagram of a semi-circular shutter operating on a star image centered on the optical axis of the system; Figure 7B represents the light flux resultant from the action of Figure 7A; and Figure 7C the resultant electrical signal from the flux curve of Figure 7B.

Figures 8 and 9 diagrammatically illustrate the nutating action of the optical wedge as it rotates about the optical axis of the system.

Figure 10 is a plan view of the nutation action on a centered star image about the optical axis.

Figures 11, 12, 13 and 14 are plan views of several shutter arrangements in accordance with the present invention.

Figure 15 is a schematic diagram of a modified star tracking system of the invention.

Figure 1:
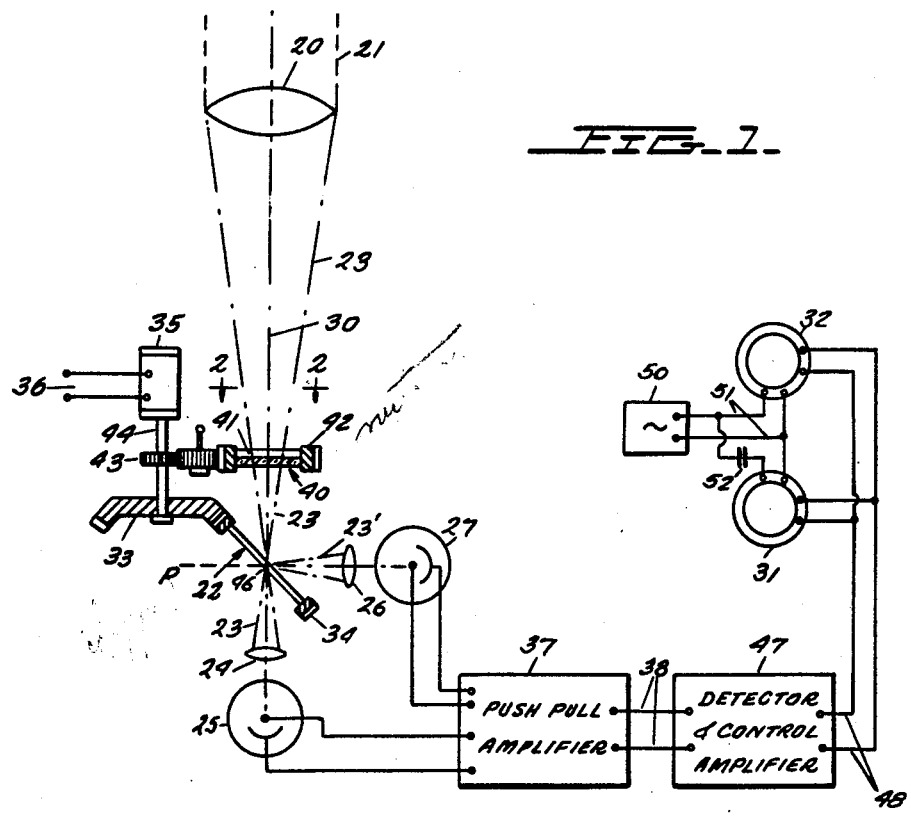
Figure 1 is a schematic representation of a star tracking system in accordance with the present invention.

The schematic representation of the star tracking system of Figure 1 is understood to apply to an automatically tracking telescope, sextant, or the like, as per the aforesaid patent and application. The objective lens 20 receives the collimated star light 21 and forms an image of the star and its associated field at or adjacent the surface of the light chopping shutter 22 located across the focal plane p. When the shutter 22 is in its light transmission position with respect to light beam 23, the beam impinges upon condenser lens 24 and thereupon onto the cathode emissive electrode of photoelectric tube 25. However, when shutter device 22, as will be further described in connection with Figures 11–14, is in its light reflecting phase, the initial star beam 23 is redirected as beam 23' to objective lens 26. Lens 26 forms a small image of the objective 20 on the photosensitive surface of photoelectric cell 27.

The dot-dash line 30 represents the optical axis of the telescope containing the objective lens 20. Optical axis 30 relates the position of the star to which the tracking system is oriented by servo tracking motors 31, 32. The mechanical details of the relation of the azimuth and elevation motors 31, 32 comprising the servo system for the tracking telescope are not detailed herein as they are otherwise well known to those skilled in the art. The shutter mechanism 22 effects the modulation of the star light or beam 23 in a manner to be more fully set forth hereinafter. Shutter 22 is rotated by bevelled gear 33 engaged with a ring gear 34 encompassing shutter 22. Bevel gear 33 is motivated by synchronous motor 35 energized from local A.C. source 36.

In the exemplary embodiment, motor 35 is a 6-pole synchronous motor energized at 400 cycles and accordingly operates at 133⅓ revolutions per second. The ratio between gears 33 and 34 is such as to mechanically drive the shutter 22 at a speed removed from that of motor 35 or gear 33. In the exemplary device, shutter 22 is rotated at 166⅔ revolutions per second. With the shutter 22 having alternate semi-circular transmission and deflecting areas, the frequency of the control signal derived by the shutter modulation of light beam 23 is at the same frequency, namely 166⅔ cycles per second.

The alternate impingement of the light flux beams 23, 23' on the respective photoelectric tubes 25, 27 results in a 180° phase displacement between the electrical signal outputs of the phototubes 25, 27. These tubes 25, 27 are connected to the amplifier 37 in push-pull relationship, wherein the signals derived from the photocells and the aforesaid light fluxes from a common star are in signal additive relation. Thus, the signal output of the push-pull amplifier 37 at leads 38, 38 is twice the amplitude of a signal derived from a single one of the photocells 25, 27. This accordingly corresponds to twice the signal output which prior shutters with opaque semi-circular sectors provided.

In other words, full utilization of the light beam 23 is afforded with the invention system. Such may be utilized to either increase the signal sensitivity and star tracking action of the system for operation on weaker stars or on stars surrounded by a greater degree of attenuation than heretofore possible. On the other hand, for a given system tracking sensitivity, the significantly greater utilization of the star flux by the invention system permits dimunition of the size or physical shape and weight of the components of its optical system. Such is quite important with regard to the use of a star tracking system as airborne equipment.

An important feature of the invention further resides in the principle of nutating the star image across the whole field and also in order that it will not remain at the optical axis when the telescope or optical axis is oriented exactly on the star track or position. Towards this end, an optical nutation device 40 is interposed in the field of light beam 23, as shown in Figure 1. The nutation modulates the star in such a manner as to produce an envelope that is essentially constant in annular thickness for all positions of the star in the field. At one position, where the star image passes through the center of the field during its nutation, the average annular amplitude drops somewhat. The nutation device 40 contains a transparent optical prism or wedge 41 mounted in an annular gear 42. Gear 42 is rotated by gear 43 secured to shaft 44 of motor 35, through an intermediate or idler gear 45. A single rotation of the wedge 41 executes a single nutation cycle or circular swing of the star image across the focal plane p, and about the focal point 46, as will be more fully described in connection with Figures 8, 9 and 10 hereinafter. The speed of rotation of the nutation member 40 in the present embodiment is 22.22 revolutions per second.

The nutating star image thereupon executes a circular pattern in the focal plane p of objective 20 at the rate of 22.22 cycles per second. A different nutation frequency may, of course, be used. The low frequency of 22.22 cycles was selected in order that no mechanical or electrical spurious signals be developed due to the operation of the nutation device 40 as to electrically interfere with the frequency of the basic positional signal derived from the rotation of shutter 22, namely 166.67 cycles per second herein. It is, of course, obvious that other speeds, and speed ratios for the respective shutter 22 and optical unit 40, may be utilized within the spirit and scope of the invention.

It is to be understood that the photoelectric devices 25 and 27 illustrated in Figure 1 may be photo-multiplier tubes such as shown in the aforesaid patent and application where high and practical amplification is performed on the small light flux from stars. In any event, their push-pull interconnection to amplifier 37 is arranged to effect the full utilization of the start light flux hereinabove set forth for the significant full efficiency of conversion available with the invention system. Further, as is to be understood, each phototube 25, 27 (or equivalent photo-multiplier tube) produces significant noise signals, particularly when the background illumination in the field of the star is scattered or has a gradient of light. However, the phototube noises, while extending over a wide spectrum, are incoherent relative to each other. Thus, their effect, when combined at amplifier 37, is not a simple algebraic addition but rather they combine as the square root of the sum of the squares of each of the noise elements.

Thus, while the system herein provides a signal at the output 38 double that of what one photocell alone would do, the composite noise output at 38 of amplifier 37 is only increased to the ratio of 1:41. Thus, the signal to noise ratio herein is improved by the factor of 2÷1.41 or over 40 percent better. This factor is equivalent to the gain alone accomplished by doubling the diameter of the aperture of the whole telescope of the system or doubling its area. In other words, for a given signal to noise ratio desired in the resultant airborne equipment for star tracking, the telescope diameter or objective lens 20 diameter may be half that of a single modulation system due to the noise alone, and half again of prior systems due to the significant signal conversion utilization at near one hundred percent of the star light flux potential.

The output 38, 38 of the amplifier 37 is impressed upon the detector and control amplifier unit 47, the output 48, 48 of which is used to drive the servo motors 31, 32. Servo motors are two-phase synchronous type as generally used in servo systems of this nature. The system amplifier 47 and its connection 48, 48 to the servos 31, 32 correspond to the circuits shown in detail therefor in the aforesaid patent and application, or otherwise as is known to those skilled in the art. The unit 47 derives the 166.67 cycle signal modulation of the star beam 23 and impresses such signal on the servo motors 31, 32. A reference frequency unit 50 of alternating current impresses the corresponding field windings of the two-phase servo motors 31, 32. The source 50 generates a reference frequency at the identical frequency of shutter 22, namely 166⅔ cycles.

The connections to the field windings of motors 31, 32 from source 50 are in the case of motor 32 direct through leads 51, 51 and to that of motor 31 through a capacitor 52. The capacitor 52 advances the phase of the current to the field winding of motor 31 by approximately 90° in order that the positional operation of servo motors 31, 32 will be in the well-known manner in response to signals from output 48. The frequency of the signals from the control amplifier 47 to output 48, 48 is at the basic system 166.67 cycles with its phase proportional to the off-center position of the star being tracked. Such off-center positional phasing of the control signal is derived through the shutter 22 action as described in the hereinbefore referred to patent and application and as is briefly summarized hereinafter in connection with Figures 5A–7C.

The servo motors 31, 32 react to the control signals at output 48, 48 in a manner to reposition the telescope, sextant, etc. so that its optical axis 30 is moved to the direction of the star selected to be tracked. When the optical axis coincides with the position of the selected star, the resultant control signal does not activate the servo motors 31, 32 and maintains the telescope and its axis 30 at the star position. Further displacement of the telescope axis 30 with respect to the star position generates further control signals at the basic frequency of 166.67 cycles herein, to in turn motivate the positioning motors 31, 32 for the retracking operation.

Figure 2 is a plan view of an exemplary form for the optical nutation device 40. Figures 3 and 4 are respective cross-sectional views at 90° displacements across the unit 40, to further illustrate its exemplary configuration. While the optical wedge 41 is shown as a circular member, other shapes therefor are also feasible. The operation of the optical wedge 41 is further described in connection with Figures 8 to 10. Wedge 41 deviates or nutates the central field or star beam with respect to the optical axis 30 thereof. The nutation of the exemplary embodiment is in a circular path (see Figure 10). However, periodic flicking of the star image in other arrangements than the circular herein are feasible and are encompassed by the present invention.

The optical wedge 41 as seen in Figure 3 has a uniform cross-section at its axis along the line 3—3 indicated in Figure 2. Its top surface 49 as seen in Figure 3 slopes from back to forward. However, in the 90° displaced transverse section 4—4 shown in Figure 4, the top surface 49 inclines from right to left. The bottom surface of wedge 41 is horizontal. However, it is equally feasible that the wedge 41 have both its top and bottom surfaces incline to the horizontal. The inclined surface as 49 of wedge 41 may be planar or curved. The basic function of the optical wedge 41, as will now be understood, is to nutate or otherwise periodically deviate the light beam 23, focused at the focal plane or shutter 22 away from the focal point or central axis 30, even when such axis 30 is aligned with the position of the desired star.

In order to more clearly set forth the present invention with respect to prior systems, the basic action of a semicircular shutter with respect to the modulation of star light flux or beam and the resultant positional signals derived therefrom is now described in connection with Figures 5A to 7C and reference is made thereto. The semicircular shutter 55, diagrammed in Figure 5A, has a 180° area of transmission and a corresponding area of opaqueness 0. The star image S in Figure 5A is off-center at shutter 55 to the left by an amount more than the image radius. The shutter 55 acts to chop the light flux from star image S in its passage to the photo-electric cells with the result illustrated in Figure 5B. The resultant flux $f$ passing to the photoelectric cells, through the action of shutter 55, produces square wave shapes between zero and the peak value.

The initial square wave 56 has only a small phase displacement from zero reference due to the corresponding position of star S with respect to the shutter phase. By amplification and filtering of the square wave shapes 56, 57, 58, etc. of Figure 5B, the square light flux patterns result in the sinusoidal control signal 59 of Figure 5C at the fundamental rotational frequency of the semi-circular shutter 55, in the exemplary embodiment at 166.67 cycles. The phase position of control signal 59 corresponds to the phase position of the initial square wave 56 of Figure 5B, which in turn represents the position of star S radially with respect to the center of shutter 55 of Figure 5A.

Figure 6 illustrates the star image S at a radial displacement similar to that of the signal in Figure 5A with, however, an angular displacement of 90° with respect to the star image of Figure 5A. It will be noted that the flux $f$ curve, Figure 6B, for the disposition of the star in Figure 6A corresponds to that of Figure 5B except that the initial square wave 60 is displaced in the time axis $t$ by an additional 90° displacement as compared to the signal 59 of Figure 5C. Such radial angular displacements of star images with respect to rotating shutters, and the signal phasing, are well known in the art as exemplified by the hereinabove referred to patent.

The central axial position of the star image S with respect to the optical axis of the telescope and, correspondingly, of the shutter 55 is illustrated in Figure 7A. In such specific case, when the star is on the optical axis of the telescope and of the shutter 55, there is no resultant chopping or modulation of its flux by the semi-circular shutter. The light flux $f$ of the curve of Figure 7B is thus indicated by uniform line 62. The amplitude of the flux represented by line 62 is half of that seen in Figures 5B and 6B from stars fully off-center and fully exposed to the photoelectric cells. Also, as is well known, the uniform light flux 62 not having any modulation results in no control signal or a near zero control signal.

When no control signal occurs in such prior signal modulation systems, the tracking motors remain unenergized and the system output, corresponding to 48, 48 of Figure 1, is the same as though no star were in the field of view of the objective. Thus, there is no indication of star presence. The basic double modulation system of the aforesaid pending application was provided to overcome such disadvantages. In accordance with the invention system, nutation of the star image when at its axial or central position results in a basic control signal that indicates star presence but does not impart positional displacement on the telescope or of the optical axis 30, as will be more fully described hereinafter.

Figures 8 and 9 are diagrammatic representations of the nutating action of optical wedge 41 when rotated with its ring gear 42 by motor 35 of Figure 1. When a light beam is passed through such optical wedge, the axis 30 or focal point of the beam is displaced from the normal focal point in a direction towards the thicker portion of the wedge. Thus, the thicker portion 41a of wedge 41 is on the right side, and the beam 23 is displaced to the right as beam 23a. Its focal point is moved to point 66, to the right along focal plane 65. The new focal point 66 is displaced to the right with respect to intersection 67 of optical axis 30 with focal plane 65.

Conversely, when optical wedge 41 is in the angular position of rotation shown in Figure 9, corresponding to a 180° displacement with respect to the position of Figure 8, beam 23 is displaced to the left, namely as the dotted section 23b. The focal point 68 of the displaced beam 23b is to the left of the normal focus point 67 on focal plane 65. The nutation displacements of beam 23 tend to cause new focal points to be slightly off the sharp focus, otherwise related to the cathode surfaces of respective photo-cells 25, 27. However, such small unfocusing results in a minor spurious signal at the 22.22 cycle rate, which being substantially lower than the control signal frequency of 166.67 herein is readily eliminated and of no consequence in the system action.

However, nutation of the focused star image results in important advantages and simplifications in the star tracking system of the present invention. Figure 10 illustrates the annular nutation pattern 70 of the star image S in the focal plane. Rotation of the optical wedge 41 at its position in Figure 1 results in the circular motivation of the new focal points corresponding to 66 and 68 in Figures 8 and 9, to form the complete annular pattern 70 of Figure 10. The deviation of star image S from the central point 67 in the focal plane and optical axis is made such that full diameters of the star S images are always presented to the transmitting and reflecting sectors of shutter 22. Point 67 of Figure 10 is also the center point of rotation of the shutter 22.

The star image circles S and S' of Figure 10 correspond in an exemplary system hereof to an actual diameter in the order of .006 inch on the focal plane. However, such image S which is really in sharp focus is termed the circle of confusion of the star. The circle of confusion S of the star is nutated about the central point 67 by means of the rotation of the nutating device or optical wedge 41. Successive positions of the star image S are indicated at dotted positions S', S' along the annular nutation pattern 70. The construction of wedge 41 is such that the outer diameter of the annular pattern 70 is made to be not less than twice the diameter of the circle of confusion S in order that each position of the star image in no way intersects the central axial point 67 in its nutation path 70.

Figure 11 is a plan view of one embodiment of the semi-circular shutter 22 shown in section in Figure 1. The body of the shutter device 22a comprises a transparent section T which may be an open area or a glass portion. The complementary semi-circular section R of shutter 22a is a reflection surface. The center of rotation 46 of shutter 22a is in the optical axis 30 and intersects the focal plane as well, as indicated in Figure 1. The semi-circular areas T, R are encompassed in an annular ring gear 34 in driving engagement with the bevelled gear 33, as heretofore described. As the gear 34 is rotated, in the indicated clockwise direction, a star image such as S has its light flux pass through the transmitting portion T to condenser lens 24 and photoelectric cell 25. When the star image S impinges upon the rotating semi-circular reflective section R of shutter 22a, it thereupon is impinged upon the condenser lens 26 and photo-electric cell 27, as already described.

The surface of section R may be mirrored glass or a highly reflective metallic surface, as desired. Its function is to efficiently reflect as much of the light flux impinging on it from objective 20 after nutation by device 40 and onto photo-electric cell 27. Thus, the shutter device 22a when used in the position indicated at 22 in Figure 1 alternately transmits the light beam 23 onto photo-electric cell 25 and then reflects it in 180° phase relationship into the complementary photo-electric cell 27. The control signal for positioning or tracking the system is thereupon derived as already set forth.

In prior systems, the general background light in the field of the desired star confused and in some instances overrode the star signal, depending on the relative brightness of the background light to the star light. Such disadvantage came about by virtue of the fact that the semi-circular shutter used progressively scanned various portions of the image of the sky. If there was one portion of the sky, say one-half of the sky, that was brighter than the other half of the sky, such flux differentials came through the telescope onto the field image. The general level of the lighting on the phototube would correspondingly increase at the signal frequency, corresponding to that generated by the rotating shutter. As a consequence, spurious signals would develop, co-mingled with the basic positioning control signal derived from the shutter modulation of the star light flux.

There are generally variations in the brightness of the sky where a star tracking device of the general nature of the present invention is normally utilized. There results a definite gradient of light due to non-uniform background illumination. This results in rhythmic increase and diminution of apparent background brightness on the photoelectric cells due to the shutter action per se. This creates spurious signals that are commingled with the signal of the star itself. An important feature of the present invention is the resolution of such background illumination and the resulting spurious signals through a novel shutter arrangement utilizing counterbalancing to eliminate its effect on star signal derivation for control purposes. Figure 12 illustrates one form of such shutter at 22b. The semi-circular transmitting T and reflecting R portions of this shutter 22b correspond to that of the shutter 22a of Figure 11.

About the transmitting section T is located a reflecting annulus sector R'. Thus, as the star flux and accompanying background illumination pass through the transmission section T of the shutter 22b to the photocell 25 (Figure 1), a significant portion or sampling of the background illumination per se is reflected by the peripheral sector R' into the companion photocell 27. In other words, background illumination that is surrounding the field of the star to be tracked is, simultaneously with its passage through section T to the photocell 25, also impinged on the photo-electric cell 27 by the reflective sector R'. Thereupon the push-pull interconnection of the photo-electric cells 25, 27 at amplifier 37 results in these separate spurious signals impressed upon photocells 25 and 27, to balance out or otherwise cancel. Such is termed "counterbalancing" herein.

Thus, simultaneous with the transmission of such spurious signals to the amplifier 37 by photocell 25, a 180° out-of-phase spurious or false signal is introduced to the amplifier through the photo-electric cell 27 to effectively minimize or cancel that signal which results from the linear portion of the gradient of background illumination which surrounds the star in the field of view. Spurious signals from higher order components of the gradient are usually insignificant. A thin annular reflective sector R' about the transmitting sector T is able, by virtue of its longer radius arm from the center of rotation 46 of the shutter 22b, to counterbalance the background light that is admitted through the section T. The linear portion of the gradient of the light that is admitted through the basic shutter at T is thus cancelled out synchronously with its admission.

When the reflecting phase area R of the shutter 22b is in position to reflect the corresponding star signal and its background illumination to the photocell 27, the associated transmitter annular sector T' serves to transmit or admit a sampling of the same background gradient illumination through the sector T' to the condenser lens 24 and onto the associated photocell 25. Thus, in a similar but reverse action, the background illumination or spurious contribution to the star signal that accompanies the light flux from reflective surface R through to the photocell 27 has its spurious signal factor counterbalanced by an identical false signal admitted through the transmitting annular sector T' to the condenser lens 24 and photocell 25 in 180° opposite phase relationship.

The push-pull interconnection of the photocells 25 and 27 causes the false signals from cell 25 to counterbalance the spurious signals at photocell 27. The result, accordingly, is a star signal essentially unaltered by non-uniformity in background illumination within the field of the star. By this means, then, tracking errors caused by the background illumination are avoided.

Figure 13 illustrates a shutter 22c as a modification of shutter 22b of Figure 12. Shutter 22c has two alternate sets of light transmitting and reflecting sectors, as 90° sections. The light transmitting sections $T_1$ and $T_2$ correspond to the action of section T of Figure 12; and the interposed reflective 90° sections $R_1$ and $R_2$, to the action of section R. The annular complementary portions about the respective transmitting and receiving sections of shutter 22c correspond to the reflective and transmitting annular counterparts R' and T' of Figure 12. The action of the shutter 22c is identical to that described for shutter 22b with the exception that the control signal generated by the 90° sectors is, for a given rate of rotation, twice that developed by the 180° sections of Figure 12. Similarly, the shutter disc may be arranged with further smaller angled symmetrical and complementary transmitting and receiving sections, and annular counterparts, for higher frequency modulation of the incident light flux.

A further modified shutter is illustrated in plan view at 22d, Figure 14. The action of shutter 22d corresponds basically to that of 22b of Figure 12 in that somewhat less than semi-circular sector $T_0$ corresponds to the semi-circular transmission area T. Also, the reflection area $R_0$ corresponds to the semi-circular section R of shutter 22b. It will be noted, however, that the sector angle subtended by the areas $T_0$ and $R_0$ is less than 180° in the Figure 14 embodiment. It has been found that by somewhat reducing the subtended angle of the $T_0$, $R_0$ sectors, the resultant control signals derived from the shutter modulation of the star light beam flux is substantially the same as with semi-circular sections. A sector angle for the areas $T_0$ and $R_0$, even down to 157°, produces control signals substantially the same in amplitude as a full 180° angle therefor, with possible reduction in the sharp rectangular corners of the waves reducing their higher harmonic content. The basic control signal derived from the shutter action of device 22d by its transmission and reflection sections by $T_0$ and $R_0$ remains essentially the same as to resultant amplitude and phase. It will also be noted that the corresponding inverse annular sectors R' reflective about transmission sector $T_0$ and the annular ring T' about the reflector sector $R_0$, correspond to that of the shutter 22b of Figure 12 and with the same resultant action.

Symmetrically between the reduced angular sectors $T_0$ and $R_0$ lie sectors 71 and 72. The exemplary shutter 22d with 157° sectors $T_0$, $R_0$, correspondingly encompasses 23° for each of the diametrical sectors 71, 72. Sector 71 extends from the center 46 of shutter 22d to the outer periphery portion 73 thereof; and sector 72 to the corresponding opposite peripheral portion 74. The narrow sectors 71, 72 are light transmitting members containing alternate uniformly spaced opaque radial lines 75, 75. The radial lines 75, 75 are arranged to constitute a raster or chopper for the star light flux and beam 23. The alternate clear and opaque areas 75, 75 chop the light beam at a higher frequency than that by the basic shutter 22d through areas $T_0$ and $R_0$. In an embodiment where ten equally spaced radial opaque lines 75, 75 were arranged in each of the sectors 71, 72, the resultant high frequency signal was ten times that of the basic 166.67 cycle frequency. Thus, in the exemplary embodiment, a high frequency signal of 1,666.7 was produced.

Such high frequency signal, at 1,666.7 cycles, is intermittent corresponding to pulse signalling in the sense that it is at zero when areas $T_0$ and $R_0$ coact with the light beam. The high frequency signal is generated by the 23° sectors 71, 72 of the shutter 22d rotation. Nevertheless, such high frequency signal is, in effect, a carrier frequency signal at the 1,666.7 cycle frequency herein, with its amplitude proportional to the brightness of the star image. The optical and electrical aspects of the generation of such carrier frequency, proportional to the star brightness, corresponds to that more fully set forth in the co-pending application Serial No. 321,218 hereinabove referred to. Reference is made thereto for further details of the theory and circuital incorporation of such raster signals for the production and utilization of the high frequency signal.

As described in the co-pending application, the resultant action of the high frequency raster on the star light flux and its background illumination is to substantially eliminate the effects of the background illumination from the operation of the star tracking system. Errors due to asymmetries in the optical and electrical system, as well as false tracking indications are eliminated by the double modulation effective by the high frequency raster action on the light beam co-jointly with a cascaded semi-circular shutter. Further, circuital arrangements are described for utilizing such high carrier frequency developed by the raster to control the amplification factor of the system inversely proportional to the effective brightness of the star light flux. The tracking sensitivity of the system is thereby made uniform over wide conditions of field operation.

In a similar manner, the high frequency signal developed by the raster sectors 75, 75 of the shutter 22b are utilized to minimize the effect of background illumination on the resultant control signals in addition to that effected by the annular rings R' and T'. Further utilization of the raster signal is to maintain the system tracking sensitivity through automatic gain control action, in a way similar to that described in the aforesaid application. Such A.G.C. action is represented schematically by lead 80 in Figure 15 and will be described more fully hereinafter. It is to be noted that the rasters 75, 75 hereof do not effectuate a double modulation of the light beam but rather single modulation thereof independently from the effective shutter action $T_0$, $R_0$. Also, there is no loss of star presence with the shutter 22d in view of the nutation device 40 used therewith. The raster spokes 75 create a signal condition in the system to permit the negation of the incorrectly phased position signal which would be developed by a star entering the peripheral position of the field of view.

Figure 15 schematically illustrates a modified star tracking system in accordance with the present invention. The light beam 23 from the objective 20 passes through nutation device 40, which in the illustrated position (corresponding to that of Figure 8), reflects the beam to the position 23a to the right of shutter center 46. Shutter 22 is shown oriented with its reflective surface R receiving the deflected beam 23a. Surface R of shutter 22 reflects the beam as 23' to the condenser lens 26 and onto the photo-emissive cathode of photoelectric cell 27. Similarly, when the shutter 22 is in its transmission T phase, the nutated light beam 23a is passed to the other electric cell 25 which is displaced from that of Figure 1, as a reflecting element 76 is utilized.

The output of photocell 27 is connected directly to individual amplifier 77 and that of photocell 25 to amplifier 78. Output transformers 81, 82 are, respectively, connected to the outputs of amplifiers 77 and 78. While various detecting means may be used as above indicated, there is here illustrated one possible use of a synchronous type detector 85. The amplifier 77, 78 outputs are connected to respective quadrature windings 86 and 87 of detector 85. The synchronous detector 85 is essentially a two-phase synchronous motor. The detector 85 is shown connected to the amplified outputs of the photocells 25, 27. A suitable phasing condenser 88 is utilized in one of the winding circuits 86, 87.

As will now be understood by those skilled in the art, the motor 85 fed from the phototube 25, 27 signals is arranged to sense the existence of the nutated star light beam 23a whenever a selected star is in the field of view. The star signal developed at the basic control frequency, herein at the 166.67 cycles, tends to rotate the output shaft 89 of the synchronous detector 85. However, the shaft 89 is restrained from rotating by suitable means. In Figure 15 lever 90 is shown restrained operating against blade 91 of switch 91, 92. Blade 91 is spring biased by spring 93 toward the lever 90. When the shaft 89 develops sufficient torque through the energization of windings 86, 87 of detector 85, lever 90 moves in the direction of the arrow to close the switch 91, 92 against the normal open biasing spring 93.

The switch 91, 92 is connected in the circuit between amplifiers 77, 78 and the input of detector control amplifier unit 95. The secondary windings of transformers 81, 82 are connected in series through common point 94, and in turn through switch 91, 92 to the input of unit 95. When a star above the minimum brightness is included in the field of view, its nutation by device 40 ensures a control signal, at the basic frequency 166.67 cycles herein, regardless of its position in the field. Such control signal activates the shaft 89 of detector 85 to close and maintain closed the switch 91, 92.

The signals from photo-electric amplifier 77, 78 are thereupon impressed upon the detector-control amplifier 95 in push-pull relation, and from there on operate in a manner similar to the system of Figure 1 at unit 47. As described in connection with Figure 1, the servo mechanism 31, 32 is actuated by the signal output from the control amplifier 95 and reference phased at the respective field windings by source 50. The phasing condenser 52 adjusts the selective positioning control by motors 31, 32 through the control signal. Such control action by the servo motors 31, 32 prevails while the switch 91, 92 is in circuit closed engagement due to energization of synchronous detector 85 and the torque motivation of its lever 90 against the switch arm 91. The synchronous detector 85, as will be understood, effects its torque action due to the presence of a light source or star to be tracked in the field of view, and when light flux from such star is above a predetermined minimum magnitude, the action of the synchronous detector 85 against the spring 93 of predetermined tension maintains the system of Figure 15 in operating "closed" condition.

In view of the elimination of the effects of the background illumination on the operation of the servo units 31, 32 and the minimization of noise due to the push-pull arrangement of photocells 25, 27, it has been found that the system in accordance with the invention herein can operate with practical and correct tracking with a much smaller resultant light beam flux from the star as compared to prior star trackers. Furthermore, the utilization of a synchronous detector such as 85, or its equivalent, in the circuit herein assures the prompt "opening" of the circuit to its stand-by mode when the star light flux and hence the control signal falls below a predetermined minimum. Such "opening" freezes the servomechanism 31, 32 at its latest position, until a suitable control signal returns to "close" the circuit into operation. When the star is outside the field of view, or out of beam 23, zero control signal also "opens" the circuit. The stand-by signal minimum is predetermined by the signal torque output characteristic of motor 85 and the restraining action of its link 90 by switch 91, 92 and spring 93.

In its operation mode, as the star signal becomes weaker, or the signal to noise ratio deteriorates, the synchronous detector 85 still maintains a torque action or angular deflection due to residual star signal. The noise content of the signal on detector 85 results in mere oscillation of the lever 90 thereof about a displacement due to the star signal itself. However, such oscillation does not destroy the basic information imparted by the lever in its closure of the switch 91, 92 against the action of spring 93, as long as the basic star flux magnitude in the beam 23 results in a control signal on the detector 85 of sufficient amplitude, namely, at or above a predetermined minimum designated for the system. While a synchronous motor has been indicated at 85, equivalent synchronous detection devices may be employed for the desired function and result; for example, an alternating current torque motor, or electronic means, could be used for such purpose.

The advantage of the use of a synchronous motor 85 with the two windings 86, 87 in the system of Figure 15 is that the signal utilized to operate the detector 85 is the basic star control signal generated by the system through amplifiers 77, 78. Such detector accordingly is entirely independent of the power supply or a reference frequency source such as 50. In essence, therefore, the basic power supply for the system of Figure 15 can vary over a wide range and not disturb the control torque developed by the star through the synchronous motor 85. Such is unique in this system, since in previous systems where linear detectors were used to sense the star signal, a narrow band circuit arrangement was required to filter out noise. Systems using narrow filters are frequency dependent. However, in the present system the operation is broad in the sense that it is effective over the excursions in the power supply frequency encountered in practice without dependence upon noise generated by the system as a limitation.

The nutation frequency, 22.22 cycles in the systems of Figures 1 and 15 herein, was selected to maintain the centered star sufficiently in the effective field beamed to the shutter 22 for control modulation, and yet low enough so that the servomechanism 31, 32 does not respond to the spurious modulations that may reach it at the 22.22 cycles.

Where the shutter 22d (Figure 14) is utilized, incorporating the raster sections 75, 75, the high frequency signal, in the exemplary embodiment 1666.67 cycles, relates a high frequency control action suitably detected at unit 95. A detected voltage, due to such high frequency raster signal, is a direct current biasing potential proportion to the magnitude of the star light flux. Such bias is connected suitably to the input sections of the amplifiers 77, 78 as indicated schematically by connection 80 from unit 95 to the respective amplifiers. In this manner the maintenance of the sensitivity of tracking is automatically effected, the same as by the raster signals in the system of the aforesaid application.

While the present invention has been illustrated with specific exemplary embodiments, it is to be understood that those skilled in the art may embody the invention with variations which are well within the spirit and scope of the invention, and it is not intended to be limited except as set forth in the following claims.

We claim:

1. In a system for tracking a source of light located in a field of non-uniform background illumination, optical means for producing an image of the source and its field of background illumination, means for nutating the image at a periodic rate, a rotatable shutter interposed in the path of the source image and its field of background illumination with means for directing the light flux thereof into two diverse paths, electrical means responsive to the light flux in each path to provide a control signal in accordance with the source position, a detector having quadrature windings in individual circuit relation with the said electrical means, and means including circuit connections controlled by said detector for maintaining the system in tracking operative condition during the source presence in the field at a light flux value above a predetermined minimum.

2. A tracking system as defined in claim 1, and in which the shutter means includes interposed raster segments to chop the light flux at a frequency substantially higher than that by the basic shutter action, and wherein the electrical means is responsive to the raster flux action to produce intermittent high frequency signals.

3. In a system for tracking a star located in a field of view, optical means producing an image of the star with a circle of confusion, means for nutating said image comprising an optical wedge proportioned to displace the star image from its optical axis position by at least half of its image diameter, a rotatable shutter interposed in the path of the star image and its field of background illumination with alternate sections for successively interrupting and directing the light flux thereof into two predetermined paths, a member with each of said sections for sampling the light flux of the background illumination and directing the sampled light flux to the path opposite to that defined by its associated section, electrical means responsive to the light flux in each path to provide a control signal in accordance with the star position, a detector having quadrature windings in individual circuit relation with said electrical means, and means controlled by said detector for maintaining the system in tracking operative condition during star presence in the field of view at a light flux value above a predetermined minimum.

4. In a system of tracking a source of light located in a field of non-uniform background illumination, optical means for producing an image of the source and its field of background illumination, a rotatable shutter interposed in the path of the source image having alternate light transmission and reflective sections for directing the light flux thereof into two predetermined paths, and a member mounted adjacent each of said sections for sampling light flux of the background illumination associated with the source image and directing the sampled light flux to the path opposite to that defined by its associated section, said members being annularly ringed about the periphery of the shutter section and opposite in light flux action to their contiguous section.

References Cited in the file of this patent

UNITED STATES PATENTS

| | | | |
|---|---|---|---|
| 2,403,066 | Evans | | July 2, 1946 |
| 2,422,971 | Kell et al. | | June 24, 1947 |
| 2,458,831 | Cady | | Jan. 11, 1949 |
| 2,513,367 | Scott | | July 4, 1950 |
| 2,713,134 | Eckweiler | | July 12, 1955 |
| 2,762,123 | Schultz et al. | | Sept. 11, 1956 |
| 2,820,906 | Miller | | Jan. 21, 1958 |
| 2,870,671 | Falconi | | Jan. 27, 1959 |